US007529530B2

(12) United States Patent
Li et al.

(10) Patent No.: US 7,529,530 B2
(45) Date of Patent: May 5, 2009

(54) WIRELESS RECEPTION APPARATUS AND METHOD

(75) Inventors: Xiao-Guang Li, Shenzhen (CN); Kuan-Hong Hsieh, Shenzhen (CN); Wen-Chuan Lian, Shenzhen (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 350 days.

(21) Appl. No.: 11/309,694

(22) Filed: Sep. 14, 2006

(65) Prior Publication Data

US 2007/0115394 A1 May 24, 2007

(30) Foreign Application Priority Data

Nov. 18, 2005 (TW) .............................. 94140637 A

(51) Int. Cl.
*H04B 1/18* (2006.01)
*H04H 20/71* (2008.01)

(52) U.S. Cl. ............... 455/161.1; 455/164.1; 455/185.1

(58) Field of Classification Search .............. 455/182.3, 455/186.1, 160.1, 161.1, 161.3, 164.1, 185.1, 455/3.01, 3.06, 556.1
See application file for complete search history.

(56) References Cited

U.S. PATENT DOCUMENTS

| | | | | |
|---|---|---|---|---|
| 5,063,610 | A * | 11/1991 | Alwadish | 455/45 |
| 6,782,239 | B2 * | 8/2004 | Johnson et al. | 455/42 |
| 6,961,550 | B2 * | 11/2005 | Ricard et al. | 455/186.1 |
| 2002/0184039 | A1 * | 12/2002 | Gong et al. | 704/500 |
| 2005/0208913 | A1 * | 9/2005 | Raisinghani et al. | 455/161.2 |

* cited by examiner

*Primary Examiner*—Sonny Trinh
(74) *Attorney, Agent, or Firm*—Winston Hsu

(57) ABSTRACT

A wireless reception apparatus is provided. The apparatus includes a scan unit for periodically scanning favorite channels which are selectable as a playing channel, and recording broadcasting signal properties of each favorite channel; an evaluation value calculating module for calculating an evaluation value of each favorite channel according to the broadcasting signal properties thereof; a channel selection module for selecting one of the favorite channels as a playing channel according to the evaluation values; and a signal receiving unit for receiving radio signals in the playing channel. A wireless reception method is also provided.

8 Claims, 4 Drawing Sheets

WIRELESS RECEPTION APPARATUS AND METHOD

TECHNICAL FIELD

The present invention relates generally to wireless reception apparatuses and methods, and particularly to a wireless reception apparatus and method that can select a tuning channel automatically.

GENERAL BACKGROUND

Automotive vehicles are commonly equipped with a radio receiver. The radio receivers are used for receiving radio signals from an external radio signal outputting device such as, a satellite radio station, in order to provide audio entertainment to the passenger(s) in the vehicle. When an automotive vehicle equipped with the radio receiver moves from a municipal area to another municipal area, the reception frequency may be interfered by a local broadcasting station, which results in poor received radio signals.

To solve such problem, traditionally, the user continuously tunes a reception frequency of the radio receiver so as to search for an appropriate reception frequency from a frequency band.

However, such tuning operations require very cumbersome manipulations. In particular, very cumbersome and heavy workloads are necessary so as to search out the appropriate reception frequency in such a frequency band where a large number of programs are broadcasted.

Thus, an improved wireless reception apparatus and method which automatically selects the reception frequency when the radio signals are weaken is needed in order to insure a good received radio signals.

SUMMARY

A wireless reception apparatus is provided. The wireless reception apparatus includes a scan unit for periodically scanning favorite channels which are selectable as a playing channel, and recording broadcasting signal properties of each favorite channel; an evaluation value calculating module for calculating an evaluation value of each favorite channel according to the broadcasting signal properties thereof; a channel selection module for selecting one of the favorite channels as a playing channel according to the evaluation values; and a signal receiving unit for receiving radio signals in the playing channel.

A wireless reception method is also provided. The wireless reception method includes the steps of: (a) periodically scanning favorite channels which are selectable as a playing channel, and recording broadcasting signal properties of each favorite channel; (b) calculating an evaluation value of each favorite channel according to the broadcasting signal properties thereof; (c) selecting one of the favorite channel as a playing channel according to the evaluation value; and (d) receiving radio signals in the playing channel.

Other advantages and novel features will be drawn from the following detailed description of the embodiments with reference to the attached drawings, in which:

DETAILED DESCRIPTION OF THE PREFERRED EMBODIMENT

Figure 1:
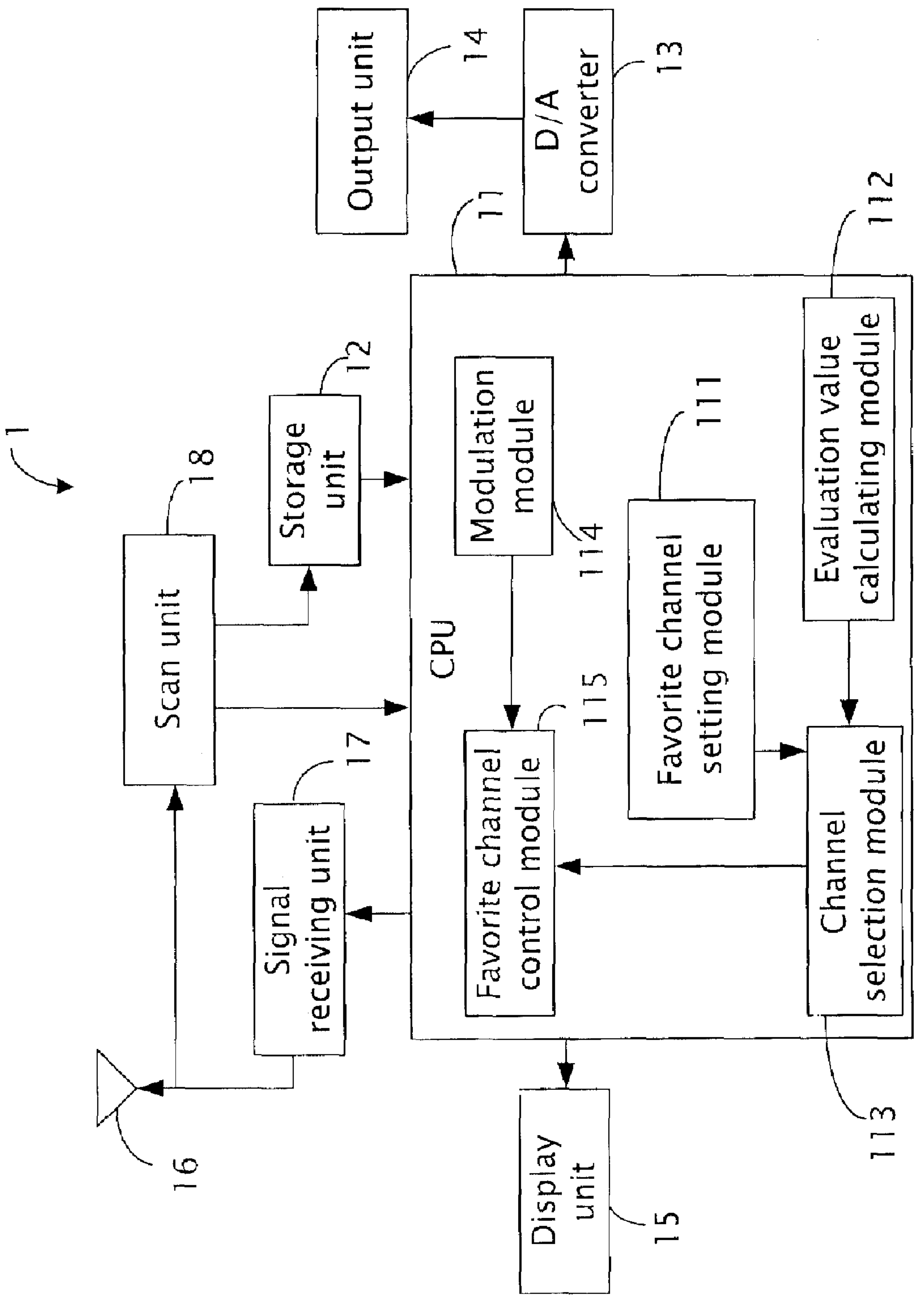
FIG. 1 is a block diagram of a wireless reception apparatus in accordance with a preferred embodiment of the present invention.

FIG. 1 is a block diagram of a wireless reception apparatus (hereafter, "the apparatus") in accordance with a preferred embodiment of the present invention. In the preferred embodiment, the apparatus 1 receives radio signals, transforms the radio signals into the audio signals, and outputs sounds corresponding to the audio signals. The apparatus 1 mainly includes a central processing unit (CPU) 11.

The apparatus 1 further includes an antenna 16, a signal receiving unit 17, and a scan unit 18. The CPU 11 is connected to the signal receiving unit 17 and the scan unit 18. The antenna 16 is used for receiving radio signals from an external radio signal outputting device such as, a satellite radio station or a broadcasting station, by the signal receiving unit 17. The CPU 11 transforms the radio signals into digital audio signals, and outputs the digital audio signals. The scan unit 18 is connected with the antenna 16 and a storage unit 12, and is used for periodically scanning/monitoring one or more favorite channels (symbolically depicted as a character $A_n$, wherein "n" represents an identification (ID) number of the favorite channel), obtaining broadcasting signal properties of each favorite channel, and storing the broadcasting signal properties of each favorite channel in the storage unit 12. The broadcasting signal properties of each favorite channel include a signal level (symbolically depicted with a character "$V_{nt}$", wherein t represents a scan period) thereof. The favorite channels are selectable to receive the radio signals correspondingly and are set in advance.

The CPU 11 is connected to a digital/analog (D/A) converter 13. The D/A converter 13 converts the digital audio signals into analog audio signals, and outputs the analog audio signals via an output unit 14. The CPU 11 is further connected to a display unit 15. The display unit 15 displays information when the apparatus 1 operates. The information may have different contents corresponding to different operation states of the apparatus 1. Specifically, the information includes the content related to audio signals currently played by the apparatus 1; the information includes a frequency of the favorite channel currently selected and used by the apparatus 1 to receive radio signals.

The CPU 11 further includes a favorite channel setting module 111, an evaluation value calculating module 112, a channel selection module 113, a favorite channel control module 114, and a modulation module 115.

The favorite channel setting module 11 configures a favorite channel list containing one or more favorite channels.

The evaluation value calculating module 112 calculates an evaluation value (symbolically depicted as a character "$P_{nt}$") of each favorite channel $A_n$ according to the broadcasting signal properties thereof correspondingly in each scan period t. The evaluation value $P_{nt}$ of a favorite channel $A_n$ is obtained according to an equation $P_{nt}=V_{nt}+\Delta V^2$, wherein "$V_{nt}$" represents a signal level of the favorite channel $A_n$ in a current scan period t, "$\Delta V$" represents a level difference between a signal level $V_{nt}$ in the current scan period t and a signal level $V_{n(t-1)}$ in the immediately preceding scan period t-1. Consequently, the evaluation value $P_{nt}$ of the favorite channels $A_n$ is: $P_{nt}=V_{nt}+(V_{nt}-V_{n(t-1)})^2$.

The channel selection module 113 selects a favorite channel $A_n$ as a playing channel according to the evaluation values Pnt. In the preferred embodiment, if the evaluation value of the playing channel is less than a first predetermined value L, and the evaluation value $P_{nt}$ of the favorite channel $A_n$ is greater than or equal to a second predetermined value K, and if the evaluation values $P_{nt}$ of the favorite channel $A_n$ in each scan period t are listed in an ascending order, the channel selection module 113 selects the favorite channel $A_n$ as the playing channel (i.e., selects the clearest reception). For example, if the current scan period is the fourth scan period, the evaluation value of the playing channel is less than a first predetermined value L and the evaluation value $P_{44}$ of the favorite channel $A_4$ is greater than a second predetermined value K, and the evaluation values of the favorite channel $A_4$ in the first scan period, the second scan period, the third scan period, and the fourth scan period are respectively 0, 24, 32, 57 (i.e., the evaluation values is in a ascending order), so the favorite channel $A_4$ is selected as the playing channel.

The favorite channel control module 114 removes a favorite channels selected from the preset favorite channels if an operation count for refusing to listen the favorite channel selected is greater than or equal to a predetermined value. The modulation module 115 modulates the radio signals into digital audio signals in the broadcasting frequency of the playing channel selected by the channel selection module 113.

Figures 2A, 2B:
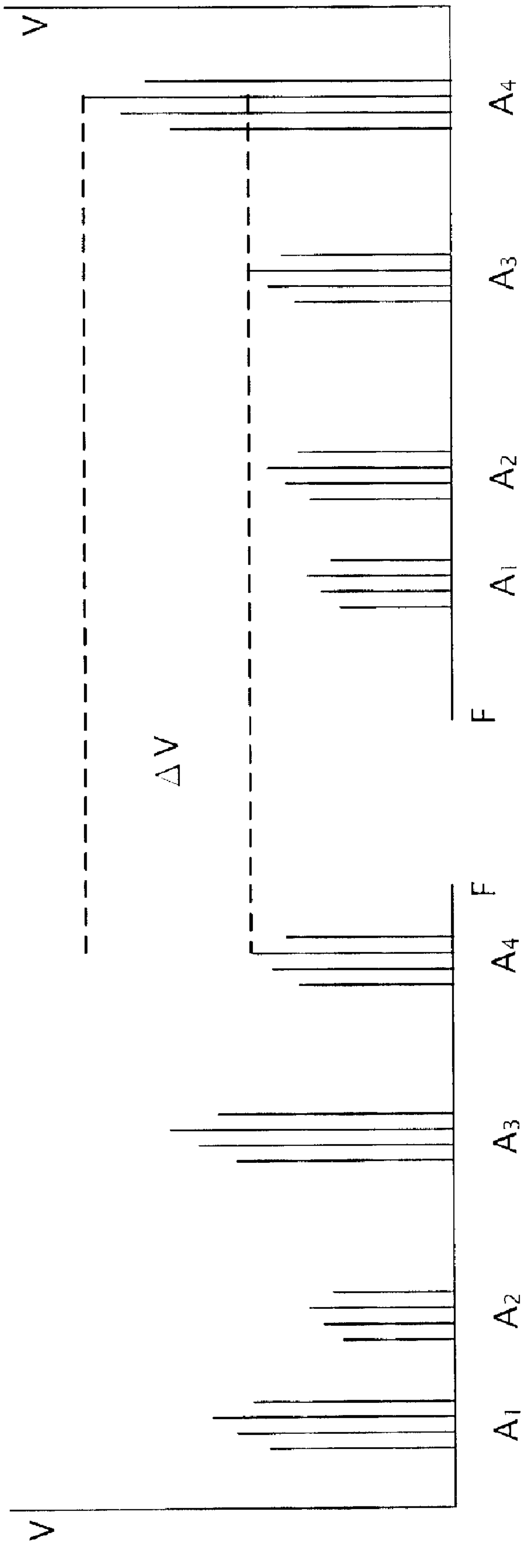
FIGS. 2*a* and 2*b* are schematic diagrams each respectively showing signal levels of favorite channels in a first scan period and a second scan period.

FIG. 2 (including FIGS. 2*a* and 2*b*) schematically shows signal levels of favorite channels in two successive scan periods. The x-axis represents the frequency (abbreviated as F), and the y-axis represents the signal level $V_{nt}$. In the preferred embodiment, the favorite channels are $A_1$, $A_2$, $A_3$, and $A_4$. For example, the evaluation value $P_{42}$ of the favorite channel A4 is: $P42=V_{42}+(V_{42}-V_{41})^2$, wherein ΔV shown in FIG. 2 is equal to "$V_{42}-V_{41}$".

Figure 3:
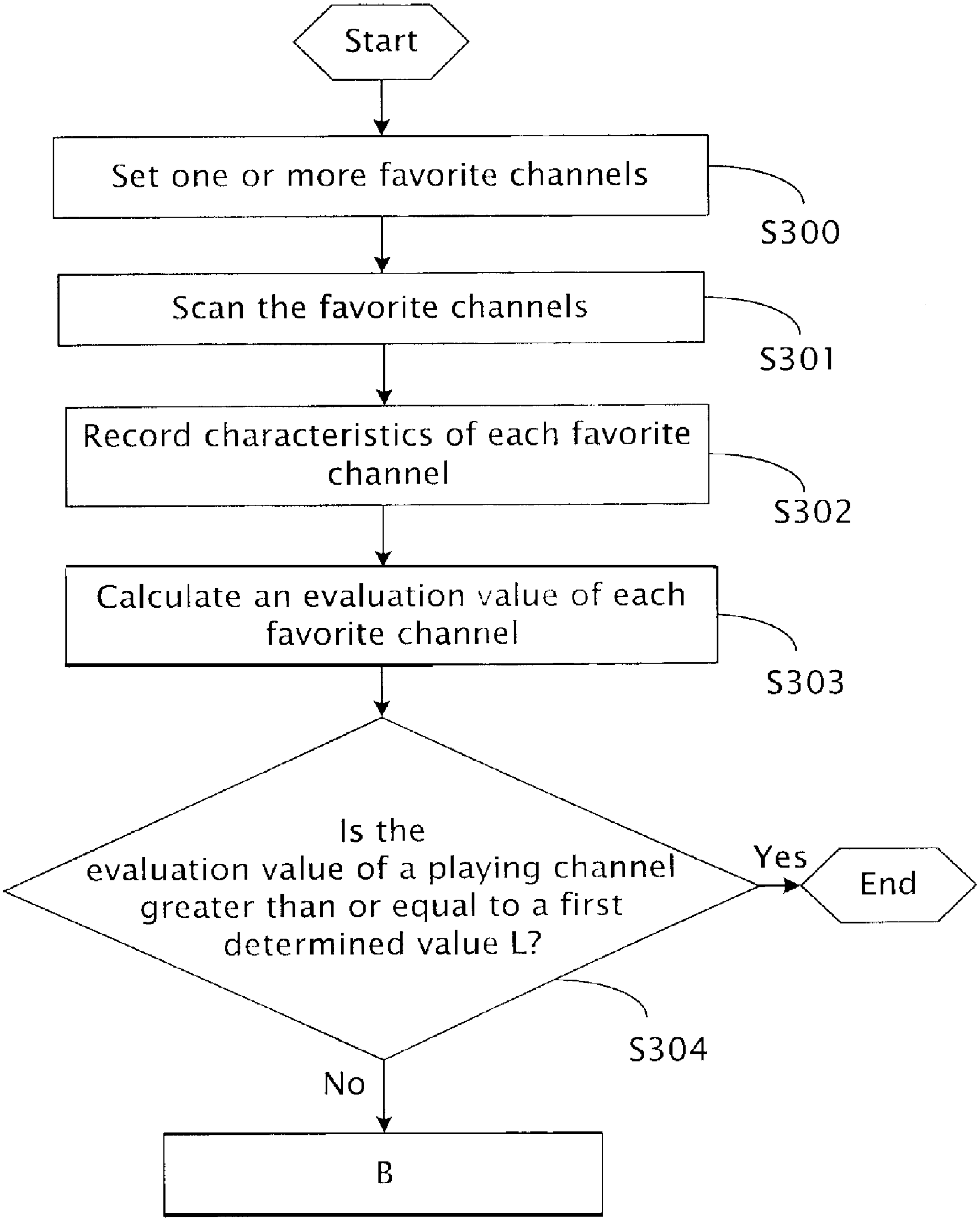
FIGS. 3 and 4 are a flowchart of a preferred method by utilizing the apparatus of FIG. 1.
Figure 4:
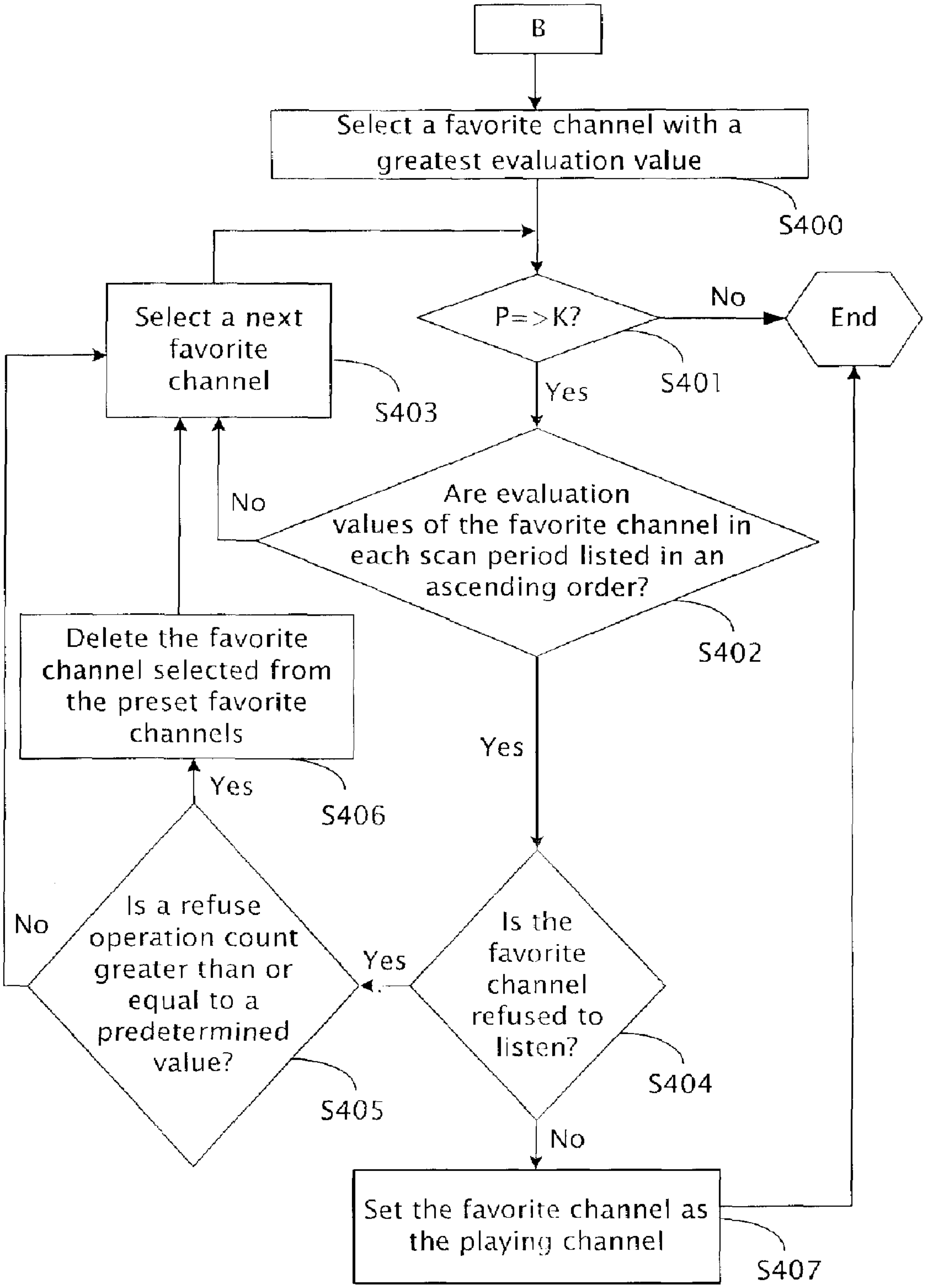

FIGS. 3 and 4 are flowcharts of a preferred method for automatically scanning a status of the favorite channels and selecting one of the favorite channels as a playing channel by utilizing the apparatus of FIG. 1.

In step S300, the favorite channel setting module 11 sets one or more favorite channels. In step S301, the scan module 18 scans the favorite channels. In step S302, the scan module 18 stores broadcasting signal properties of each favorite channel in the storage unit 12. The broadcasting signal properties of each favorite channel include a signal level $V_{nt}$. In step S303, the evaluation value calculating module 112 calculates an evaluation value $P_{nt}$ of each favorite channel $A_n$. In step S304, the channel selection module 113 analyzes whether the evaluation value of the playing channel is greater than or equal to a first predetermined value L. If so, the procedure is finished. Specifically, the playing channel $A_n$ does not need to be changed, and the scan procedure will be re-performed in the next scan period. Otherwise, the procedure goes to procedure B in FIG. 5 described below.

As shown in FIG. 4, in step S400, the channel selection module 113 selects a favorite channel with a greatest evaluation value. In step S401, the channel selection module 113 analyzes whether the evaluation value of the favorite channel is equal to or greater than a second predetermined value K. If the evaluation value is less than the second predetermined value K, the procedure is finished. Specifically, all favorite channels are improper, and the scan procedure will be re-performed in the next scan period. Otherwise, in step S402, the channel selection module 113 analyzes whether the evaluation values of the favorite channel in each scan period are listed in an ascending order according to scan records in the storage unit 12. If the evaluation values are listed in a descending order or other orders, in step S403, the channel selection module 113 selects the next favorite channel according to evaluation values arranged in the descending order, whereupon the procedure returns to step S401 described above. Otherwise, in step S404, the favorite channel control module 114 detects whether the favorite channel has been refused corresponding the refuse operation. If so, the procedure goes to step S405 described below. Otherwise, in step S407, the channel selection module 113 sets the favorite channel as the playing channel, whereupon the procedure is finished.

In step S405, the favorite channel control module 114 determines whether the refuse operation count is equal to or greater than a predetermined value. If the refuse operation count is less than the predetermined value, the procedure returns to step S403 described above. Otherwise, in step S406, the favorite channel control module 114 removes the favorite channel selected from the preset favorite channels, whereupon the procedure returns to step S403.

In the preferred embodiment, the display unit 15 displays the frequency of the favorite channel selected when the apparatus 1 selects a favorite channel as the playing channel.

Although the present invention has been specifically described on the basis of the preferred embodiment including the preferred method, the invention is not to construed as being limited thereto. Various changes or modifications may be made to the embodiment including the method without departing from the scope and spirit of the invention.

What is claimed is:

1. A wireless reception apparatus comprising:

a scan unit for periodically scanning favorite channels which are selectable as a playing channel, and recording broadcasting signal properties of each favorite channel, wherein the broadcasting signal properties comprise a signal level;

an evaluation value calculating module for calculating an evaluation value of each favorite channel according to an equation $P=V_{nt}+\Delta V^2$, in which Vnt represents a signal level of a $n_t$ favorite channel in a current scan period t, ΔV represents a level difference between a signal level $V_{nt}$ in the current scan period t and a signal level $V_{n(t-1)}$ in an immediately preceding scan period t-1;

a channel selection module for selecting one of the favorite channels as a playing channel according to the evaluation values; and a signal receiving unit for receiving radio signals in the playing channel.

2. The apparatus according to claim 1, further comprising a favorite channels setting module for setting the favorite channels.

3. The apparatus according to claim 1, wherein the channel selection module selects one of the favorite channels as the playing channel if the evaluation value of the playing channel is less than a first predetermined value, and the evaluation value of the favorite channel is greater than or equal to a second predetermined value, and the evaluation values of the favorite channel in each scan period are listed in an ascending order.

4. The apparatus according to claim 3, further comprising a favorite channel control module for removing favorite channel selected from the preset favorite channels if the an operation count for refusing to listen the favorite channel selected is greater than or equal to a predetermined value.

5. A wireless reception method comprising the steps of:

periodically scanning favorite channels which are selectable as a playing channel, and recording broadcasting signal properties of each favorite channel, wherein the broadcasting signal properties comprise a signal level;

calculating an evaluation value of each favorite channel according to an equation $P=V_{nt}+\Delta V^2$, in which Vnt represents a signal level of a $n_t$ favorite channel in a current scan period t, ΔV represents a level difference between a signal level Vnt in the current scan period t and a signal level $V_{n(t-1)}$ in an immediately preceding scan period t-1;

selecting one of the favorite channels as a playing channel according to the evaluation value; and receiving radio signals in the playing channel.

6. The method according to claim 5, further comprising the step of setting one or more favorite channels.

7. The method according to claim 5, wherein one of the favorite channel is selected as the playing channel if the evaluation value of the playing channel is less than a first predetermined value, and the evaluation value of the favorite channel is greater than or equal to a second predetermined value, and the evaluation values of the favorite channel in each scan period are listed in an ascending order.

8. The method according to claim 7, further comprising the step of removing the favorite channel selected from the preset favorite channels if an operation count for refusing to listen the favorite channel selected is greater than or equal to a predetermined value.

* * * * *